United States Patent [19]
Zhukov et al.

[11] Patent Number: 4,533,243
[45] Date of Patent: Aug. 6, 1985

[54] LIGHT GUIDE FOR TRANSMITTING THERMAL RADIATION FROM MELT TO PYROMETER AND METHOD OF MEASURING TEMPERATURE OF MOLTEN METAL IN METALLURGICAL VESSEL WITH THE AID OF SAID LIGHT GUIDE

[75] Inventors: Leonid F. Zhukov; Evgeny G. Chugunny, both of Kiev; Garold P. Samchenko, Lvov; Vladimir S. Shumikhin, Kiev; Mechislav V. Zhelnis, Kaunas; Ivan V. Kushinsky, Lvov; Pranas V. Zemlyavichus, Kaunas, all of U.S.S.R.

[73] Assignee: Institut Problem Litiya Akademii Nauk Ukrainskoi SSR, Kiev, U.S.S.R.

[21] Appl. No.: 361,904

[22] PCT Filed: Jul. 31, 1980

[86] PCT No.: PCT/SU80/00120
§ 371 Date: Mar. 15, 1982
§ 102(e) Date: Mar. 15, 1982

[87] PCT Pub. No.: WO82/00518
PCT Pub. Date: Feb. 18, 1982

[51] Int. Cl.$^3$ .............................................. G01J 5/08
[52] U.S. Cl. .................................... 356/44; 350/96.15; 374/139
[58] Field of Search ............... 356/44; 350/96.15; 250/227, 231 R; 374/130, 131, 139, 140

[56] References Cited
U.S. PATENT DOCUMENTS

| | | | |
|---|---|---|---|
| 1,475,365 | 11/1923 | Schueler et al. | 356/44 |
| 3,103,546 | 9/1963 | Kapany | 250/227 |
| 3,570,277 | 3/1971 | Dorr et al. | |
| 3,626,758 | 12/1971 | Stewart et al. | 356/44 |
| 3,745,834 | 7/1973 | Veltze et al. | 356/44 |
| 4,114,592 | 9/1978 | Winston | 250/227 |
| 4,377,347 | 3/1983 | Hanmyo et al. | 374/139 |

FOREIGN PATENT DOCUMENTS

| | | | |
|---|---|---|---|
| 280650 | 5/1968 | Austria . | |
| 2338532 | 9/1976 | Fed. Rep. of Germany . | |
| 1455075 | 11/1976 | United Kingdom . | |
| 1541787 | 3/1979 | United Kingdom | 350/96.15 |
| 146533 | of 1962 | U.S.S.R. . | |
| 271067 | 8/1970 | U.S.S.R. . | |

Primary Examiner—Vincent P. McGraw
Attorney, Agent, or Firm—Lilling & Greenspan

[57] ABSTRACT

The light guide and the method of measuring temperature with the aid of said light guide relate to optical pyrometry of melts.

A light guide 1 is made from a light-permeable refractory corrosion-resistant material such as leucosapphire, for example, and according to the invention comprises 2 portions: a narrow portion 2 in the form of a rod, and a large portion 3 with a flat end 3a being an operating end of the light guide 1. The large portion 3 of the light guide 1 represents with respect to the narrow portion 2 an optical cavity producing radiation of the operating end 3a substantially in the form of a radiation of an absolutely black body. The ratio of the cross-section area of the narrow portion 2 at the place where it adjoins the large portion 3 does not exceed 0.5.

According to the method the light guide 1 is mounted in a lining 6 so that the large portion 3 is exposed to a melt 5 and the narrow portion 2 extends to a pyrometer 7 so that the geometrical axis of the light guide 1 passes through the point of the inner surface of the lining 6, located in a zone l of the maximum circulation of the melt 5. Said point is located with respect to a residual level 5a of the melt 5 at a depth h not less than the sum of a thickness t of the lining 6 at said level and a value equal to the half maximum transverse size d of the large portion 3 of the light guide 1. With the aid of the pyrometer 7 the temperature of the melt 5 is determined by measuring characteristics of the thermal radiation caused by the melt 5 in the area directly adjacent to said point on the inner surface of the lining 6 and transmitted to said pyrometer through the light guide 1.

The light guide and the method may substantially be employed in metallurgy and foundry for measuring temperatures of molten ferrous and non-ferrous metals.

7 Claims, 11 Drawing Figures

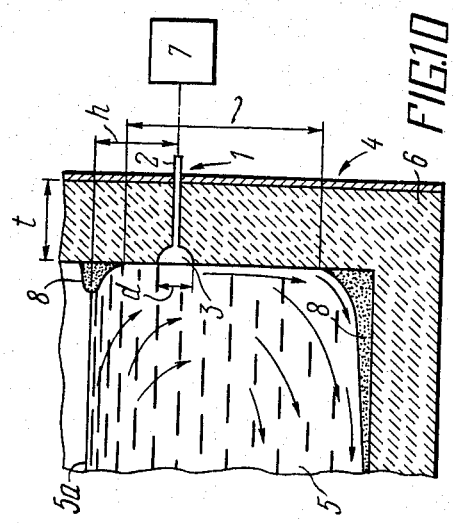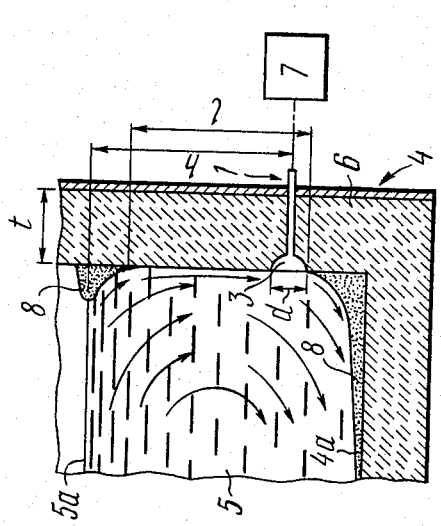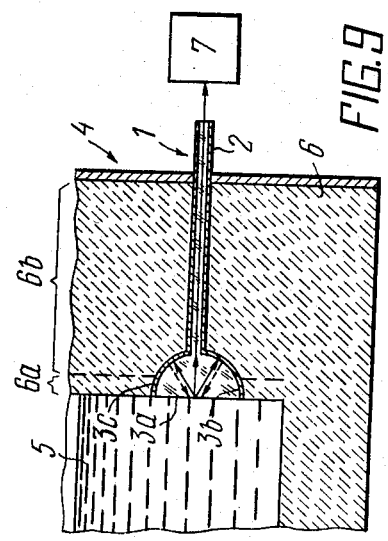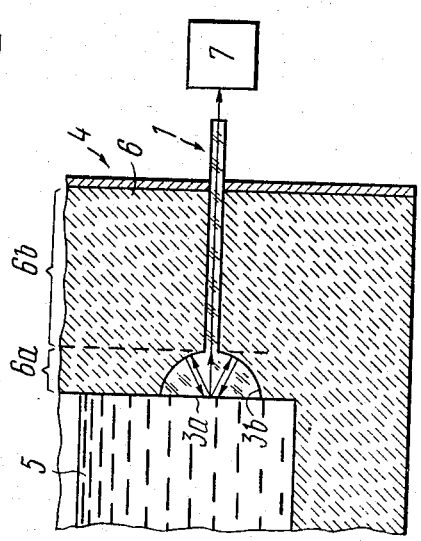

LIGHT GUIDE FOR TRANSMITTING THERMAL RADIATION FROM MELT TO PYROMETER AND METHOD OF MEASURING TEMPERATURE OF MOLTEN METAL IN METALLURGICAL VESSEL WITH THE AID OF SAID LIGHT GUIDE

BACKGROUND OF THE INVENTION

1. Technical Field

The present invention relates to measuring techniques, in particular, to optical pyrometry of molten metals and, more specifically, to a light guide for transmitting thermal radiation from a melt to a pyrometer, and also to a method of measuring temperature of a melt in a metallurgical vessel with the use of said light guide.

2. Description of the Prior Art

Alongside with the unquestionable advantages the optical pyrometry has over other methods used for measuring temperature, in particular, over the measuring method using thermocouples immersed in a melt (a possibility to provide continuous temperature control, non-contact measuring process, etc.), the use of optical pyrometry for industrial production purposes is associated with certain difficulties. In particular, pyrometer readings depend to a large extent on optical characteristics of the radiating surface and of the intermediate medium.

One of the most promising fields in optical pyrometry of molten metals is the development of methods based on the use of light guides forming an isolated channel for transmitting thermal radiation from a melt to a pyrometer thus allowing the influence of the abovementioned factors on measurement accuracy to be decreased.

An important problem which specialists in this field of optical pyrometry are faced with is the development of light guides highly reliable in operation, having satisfactory optical characteristics and providing more accurate temperature measurements even in the case of using pyrometers which are simple in construction.

A great number of patents have been granted recently in various countries, which shows that this is an urgent problem and that attempts are made to solve it (Cf., for example, the USSR Authors' Certificates No. 146,533, 1961, No. 271,067, 1970, U.S. Pat. No. 3,745,834, 1973, FRG Pat. No. 2,338,532, 1976). In spite of the many attempts which have been made, the above problem has not been satisfactorily solved yet.

In all known constructions the light guide is arranged, for example, in a cylinder and has a constant cross-section. In particular, such is the embodiment of the light guide for transmitting thermal radiation from a molten metal to a pyrometer disclosed in the Austrian Pat. No. 280,650, 1970. This light guide is made from a light permeable refractory corrosion-resistant material, for example, from quartz glass.

The temperature of the melt is measured with the aid of said light guide in the following manner. The light guide is mounted in the lining of an apparatus, preferably of a metallurgical vessel filled with a molten metal, so that the operating end of the light guide is in contact with the melt. A spectral ratio pyrometer is positioned at the opposite end of the light guide. Thermal radiation caused by a high temperature of a controlled medium (melt) is transmitted along the light guide through the metallurgical vessel lining to a pyrometer by whose readings a temperature of the melt is determined.

When measuring temperature of a melt with the aid of the above light guide, the following difficulties arise. First of all it should be noted that the influence of variation of radiation ability of the light guide operating end on the measurement accuracy is not excluded. This variation may be caused, for example, by a change in the chemical composition of the controlled medium (change of a melt) or deterioration of the operating end surface during its servicing (an increase of its roughness, appearance of microcracks, etc.). In such cases one-valued correspondence of the thermal radiation of the operating end to the temperature of the latter and consequently the temperature of the melt is disturbed.

In addition, if the melt being controlled possesses such optical characteristics that radiation ability of the light guide operating end and, consequently, the intensity of the radiation being transmitted are inconsiderable, there arises a necessity to use pyrometers with highly sensitive radiation receivers.

It should also be emphasized that to decrease the influence of the variation in the radiation ability of the light guide operating end on the measurement accuracy, as has been stated above, complex and costly pyrometers are required, such as a spectral ratio pyrometer and a pyrometer with automatic correction. Nevertheless, even with the aid of such pyrometers it is not possible to completely rule out the influence of said factor on measurement accuracy.

It is also to be noted that in the prior art method of measuring temperature of a molten metal with the aid of said light guide the problem of selecting a best suited place for mounting the light guide in the metallurgical vessel lining has not been solved. When the light guide is mounted arbitrary in the lining, its operating end is frequently deteriorated due to thermal shocks (sharp temperature change) occurring when a molten metal is poured into the vessel crucible or poured out, when the furnace is charged or the vessel is inclined as well as in other cases.

In addition to this, the light guide in many cases is deteriorated in that part thereof which is set deep inside the lining, either due to the variation of the temperature gradient with thickness of the lining in the place where the light guide is mounted or due to the lining displacement with respect to the furnace shell and relative offsetting of said lining layers during operation.

It should be stressed that in so far as in the metallurgical vessel there are zones wherein the temperature of the melt considerably varies from said vessel mass-average temperature, an arbitrary mounting of the light guide will not ensure reliable information on its mass-average temperature. Let us also note that if the light guide is found in the crucible slagging zone, then as a result of change in the temperature drop between the melt and the operating end of the light guide, measurement errors will be even greater.

Thus, an arbitrary mounting of the light guide does not provide a required accuracy of measuring mass-average temperature of the melt in the metallurgical vessel, which frequently does not meet the demands of the melting process.

SUMMARY OF THE INVENTION

The present invention resides in the provision of a method of measuring temperature of a molten metal in a metallurgical vessel and a light guide for transmitting thermal radiation for carrying out the same, which, by stabilizing characteristics of the thermal radiation being transmitted, would increase accuracy of measuring average mass temperature by using pyrometers of simpler designs.

These and other objects of the present invention are attained by a light guide for transmitting thermal radiation from a molten metal to a pyrometer, made from a light-permeable refractory corrosionresistant material, which according to the invention, comprises a narrow part in the form of a rod and a large part adjacent thereto having a flat end forming an operating end of the light guide, which large part representing with respect to said narrow part an optical cavity used to form the radiation of the operating end, substantially, in the form of radiation of an absolutely black body, with the cross-section area ratio of the narrow portion of the light guide at the place of the narrow portion adjoining the large portion to the area of the lateral surface of the large portion not exceeding 0.5.

The light guide of such construction simulates with its large portion an absolutely black body whose thermal radiation, as is known, does not depend either on the chemical composition of the simulating cavity or roughness of its inner surface but is solely determined by the absolute temperature of this surface, which is derived from Kirchhoff's and Planck's laws. In this case the narrow portion (the rod) of the light guide performs the function of a channel for transmitting radiation of said cavity through the metallurgic vessel wall to a pyrometer. Therefore when employing such a light guide, the radiation ability of its operating end will practically be stable at a predetermined temperature of the molten metal irrespective of both its chemical composition and the surface condition of this end, i.e. there will always be observed an one-valued correspondence of the temperature of the operating end to its thermal radiation.

It should also be noted conformity with the Kirchhoff's law the radiation of heated bodies at the predetermined temperature is proportional to their absorbing ability. In so far as the absorbing ability of the absolutely black body is maximal and is equal to 1, this body will radiate more energy than any other body having the same temperature. That is why the employment of the proposed light guide simulating an absolutely black body makes it possible to increase the intensity of radiation transmitted from a melt to a pyrometer to a maximum possible value at the predetermined temperature. This considerably reduces the requirements placed on the sensitivity of the pyrometers, their construction and ensures an increase of accuracy in measuring the temperature of the melt.

To attain the above result, in manufacturing the light guide it is necessary to keep within the recommended ranges the area ratio of the cross-section of the narrow portion of the light guide to the area of the lateral surface of its large portion. In case this ratio exceeds 0.5, the component of the measurement error arrising due to variation of the radiation ability of the light guide operating end is in excess of a permissible error in measuring the temperature of the melt.

The proposed light guide is suitable for mounting in any layer of the metallurgical vessel lining and is especially advantageous in the case when its large portion is located in the isothermic layer of the lining, i.e. in the layer with equal temperature for all the points coinciding with the temperature of the melt where the light guide operating end contacts the zone of said melt. In the isothermic layer between the light guide operating end the lateral surface of its large portion is established an equilibrium thermal radiation ensuring most efficient observance of an one-valued ratio between the temperature of the operating end the radiation received by the pyrometer.

It is expedient that the proposed light guide be manufactured so that the lateral surface of its large portion have a mirror layer and such a shape that the radiation of the light guide operating end is reflected from this surface back to the operating end thereof. The light guide of such a modification can well be mounted both in the isothermic and non-isothermic layers of the lining. In the latter case due to the corresponding shape of the lateral surface of the light guide large portion and a mirror coating thereof, all radiation of the operating end is reflected from said surface back to the same operating end. As a result, the characteristics of the radiation passing through the narrow portion of the light guide to the pyrometer will always be constant at the predetermined temperature of a melt.

In this case it is preferable to make the light guide in conformity with the modification wherein the lateral surface of its large portion has a surface form of the body of revolution with a convex generatrix. As has been proved by the research, such a shape of the light guide large portion contributes to the greatest extent to reflecting its operating end radiation back to the same end.

In particular, best results are achieved when the light guide large portion is constructed in the form of a hemisphere whereas the narrow portion is constructed in the form of a cylindrical rod with a diameter not exceeding 0.8 the diameter of the hemisphere. If the rod diameter exceeds 0.8 the diameter of the hemisphere the temperature measurement error is in excess of a permissible value.

These and other objects of the present invention are also attained by that in a method for measuring the temperature of a molten metal in a metallurgical vessel, which comprises mounting a light guide in the metallurgical vessel lining and determining by means of a pyrometer the temperature of a melt by its thermal radiation transmitted to this pyrometer by said light guide, according to the invention, the light guide is placed so that its large portion is exposed to a melt and the narrow portion of the light guide extends through the lining outside to the pyrometer in such a manner that the light guide geometrical axis passes through the point of the lining inner surface, which point is located in the zone of a maximum circulation of the melt and lying relative to the residual level of the melt at a depth not less than the sum of the lining thickness at said level and a value which is equal to a half the maximum transverse size of the light guide large portion, the temperature of the molten metal being determined by measuring characteristics of the thermal radiation caused by the melt in the area adjacent said point of the lining inner surface.

Here and further by the residual level of a melt is meant a level of that portion of the melt which remains in the crucible of the metallurgical vessel after melting has been finished and the main mass of the molten metal has been poured out.

The proposed method realized with the aid of said light guide ensures a higher measurement accuracy of the average mass temperature of the molten metal due to the following factors.

Firstly, in the zone of the greatest circulation of the melt practically there is no slagging, and a temperature drop between the main mass of the melt in this zone (and also the light guide operating end) will be minimum. In particular, for melting pig iron in an induction crucible furnace of a commercial frequency at a temperature of 1,500° C. and a circulation speed of up to 4 m/s this drop does not exceed 2K. That is why the point selected within the range of said zone is characteristic for all the mass of the melt because said point has a temperature essentially coinciding with the average mass temperature of the melt. Thus, if the characteristics of the thermal radiation are measured just in this point or on the portion adjoining it, the results of measuring the temperature of the melt will be reliable.

Secondly, as has been proved by experiments a considerable variation in the temperature gradient depending on the lining thickness, which may cause the light guide deterioration, takes place with respect to the residual level of the melt within the depth of the melt which is equal to the lining thickness at this level. Therefore if said measuring point selected within the zone of the greatest circulation of the melt is located at a depth exceeding the lining thickness, then such a point is not only a characteristic one but is also a point at whose level the temperature gradient depending on the lining thickness varies to a small value and only due to the change of the melt temperature in the process of the metallurgical vessel operation. For this purpose the light guide geometrical axis must be located at a depth not less than the sum of the lining thickness at said level and the value equal to a half of the maximum transverse size of the light guide large portion. It is quite understood that stability of the temperature gradient, which is achieved in this case prevents a failure of the middle portion of the light guide. Furthermore, in so far as the light guide operating end, according to the proposed method, is constantly immersed in the melt (also when the main mass of the melt is poured out), thermal shocks which cause deterioration of the operating end of said light guide are excluded. All this ensures a stable transmission of the thermal radiation of the melt through the light guide to a pyrometer, which improves reliability and measurement accuracy.

It is expedient to realize the proposed method of measuring temperature in accordance with the preferable embodiment thereof, wherein said light guide is mounted in such a manner as to have said point on the inner surface of the lining at the closest possible distance within the range of the greatest circulation zone of the melt from the bottom of the metallurgical vessel. In this modification of the method embodiment a probability of the light guide failure is further decreased because a relative offset of the lining layers which is one of the reasons of such failure is minimum at the bottom and increases with height of the metallurgical vessel.

BRIEF DESCRIPTION OF DRAWINGS

The invention will be described further, by way of example with reference to the accompanying drawings, in which:

FIG. 8 is a partial cross-section of a metallurgical vessel with the proposed light guide mounted in the isothermic zone of the lining and a pyrometer placed outside said metallurgical vessel (direction of thermal beams is shown by arrows);

FIG. 9 is a view similar to FIG. 8, when the light guide is mounted in the non-isothermic zone of the lining (radiated thermal beams are shown by solid arrows, reflected beams—by dotted arrows);

FIG. 10 is a diagrammatic representation of the embodiment for carrying out the method of measuring temperature with the aid or proposed light guide (circulation of the melt in the metallurgical vessel is arbitrary shown by arrows); and FIG. 11 is a view similar to FIG. 10 but showing a modification wherein for the embodiment of said method the light guide is mounted close to the bottom of the metallurgical vessel.

DESCRIPTION OF THE PREFERRED EMBODIMENTS

Figure 1:
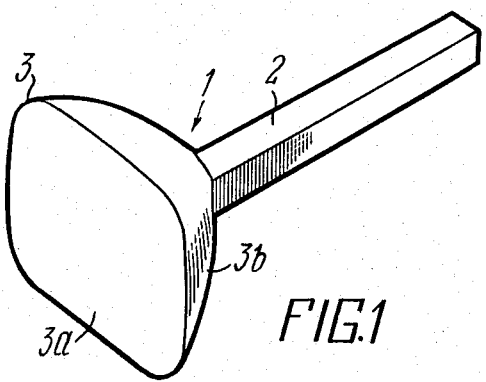
FIG. 1 is an axonometric representation of a light guide for transmitting thermal radiation from a molten metal to a pyrometer, according to the invention.

A proposed light guide 1 (FIG. 1) for transmitting thermal radiation from a molten metal to a pyrometer is made from a light-permeable refractory corrosion-resistant material, of synthetic corundum, for example. According to the invention, the light guide 1 has a narrow portion 2 in the form of a rod and adjoining thereto a large portion 3 with a flat end 3a which is an operating end of said light guide. The dimensions of the light guide 1 are selected so that the ratio of the cross-section surface of the narrow portion 2 at the place of the narrow portion adjoining the large portion 3 to the area of the lateral surface 3b of the large portion 3 does not exceed 0.5. In this case the determining size is the cross-section area of the narrow portion 2, and more accurately, the maximum transverse portion size which is selected depending on the strength characteristics of the material used for the light guide 1 and the optical characteristics of the pyrometer for which the light guide is designed (the pyrometer is not shown in the drawing).

With such a ratio of said areas the large portion 3 of the light guide 1 is with respect to the narrow portion 2 an optical cavity which makes it possible to produce radiation of the operating end 3a arising when the latter contacts the melt essentially in the form of radiation of an absolutely black body. As has been shown above, at such a nature of radiation of the operating end of the light guide 1 the radiation ability of said end is stable at the predetermined temperature of the melt being controlled and does not depend either on the chemical composition of the latter or on roughness of the operating end 3a.

It should also be noted that the shape of the cross-section of both the narrow portion 2 and the large portion 3 of the light guide 1 may be different and is determined depending on specific conditions of the light guide employment such as the design of the metallurgical vessel, the location of mounting the light guide, the material it is made from, temperature variations of the melt and other factors. In this case said conditions determine to a gereater extent the form of the large portion 3 than the form of the narrow portion 2 of the light guide 1. In FIGS. 2 through 7 of the accompanying drawings there are illustrated some alternate embodiments of the light guide 1 varying essentially in the form of the large portion 3 thereof.

Figure 2:
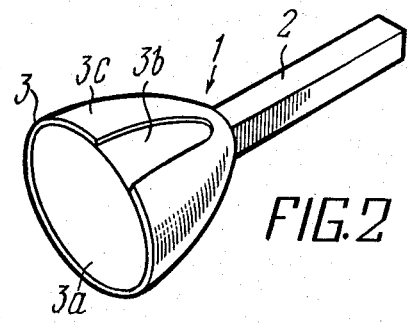
FIG. 2 is a view similar to FIG. 1, but showing a modification, wherein the lateral surface of the light guide large portion is coated with a mirror layer and has the surface form of the body of revolution with a convex generatrix according to the invention.

FIG. 2 illustrates an embodiment, wherein the lateral surface 3b of the large portion 3 of the light guide 1 has the surface form of a revolution body with a convex generatrix. Said surface is coated with a mirror layer 3c made from platinum, rhodium or some other material suitable for this purpose. The thickness of the layer 3c and its composition are chosen depending on the chemical composition of the melt, on the metallurgical vessel lining, their temperatures, dimensions and material of the light guide as well as on the required time of the light guide continuous operation. The narrow portion 2 of the light guide 1 is constructed in the form of a rod having a rectangular cross-section.

With such a form, as shown in FIG. 2, of the lateral surface 3b of the large portion 3 of the light guide 1 the beams incident on said surface from the operating end 3a will be reflected therefrom back to said end in conformity with the laws of geometrical optics. It is quite evident that in addition to the form of the body of revolution with a convex component the lateral surface 3b may have some other form, wherein the thermal radiation of the operating end 3a is reflected from the surface 3b back to the same end. Selecting some other similar form does not present a problem, and will be apparent to those skilled in the art. The mirror coating 3b with the corresponding form of the lateral surface 36 makes it possible that the proposed light guide be well employed both in the isothermic and non-isothermic layers of the lining.

The light guide in conformity with a modification illustrated in FIG. 2 is better made from quartz glass and be employed in the metallurgical vessels whose thickness of the isothermic layer of the crucible wall is less than the length of the large portion 3 of the light guide 1.

Here and further by the term "length" we shall designate the dimensions of the light guide or its portion determined along the geometrical axis of the light guide.

The light guide constructed in accordance with said modification is fit for mounting in the side wall of the metallurgical vessel, in particular, in such metallurgical vessels as induction, channel furnaces, crucibles, and bale-out pot furnaces.

Figure 3:
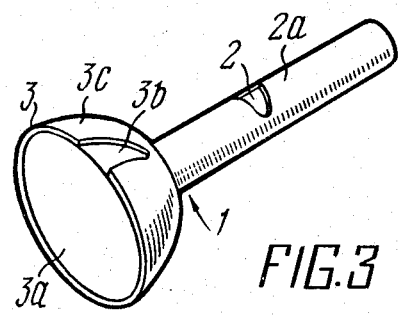
FIG. 3 is a view similar to FIG. 1, but showing a modification, wherein the light guide large portion is constructed in the form of a hemisphere while the narrow portion is constructed in the form of a cylindrical rod with the light guide whole lateral surface being coated with a mirror layer, according to the invention.

Nevertheless, under the same conditions it is more profitable to employ the light guide constructed, as shown in FIG. 3 of the appended drawings. According to this modification the large portion 3 of the light guide 1 is constructed in the form of a hemisphere whereas the narrow portion 2 is constructed in the form of a cylindrical rod with a diameter not exceeding 0.8 diameter of the hemisphere. When the surface 3b is of a spherical form, the number of reflections of thermal beams radiated by the operating end when said end contacts the melt is minimal, which results in decreasing losses of the thermal energy transmitted by the light guide 1. In the given modification to further decrease the energy losses, not only the large portion of the light guide is coated with the mirror layer 3c but the narrow portion too is coated with a similar layer 2a.

In the light guide, according to said modification, a cylindrical form the narrow portion 2 has which is simpler for manufacturing than that in the modification illustrated in FIG. 2. This is especially important when for the production of the light guide hard-to-treat materials such as synthetic corundum are used. When comparing possible uses of the modifications illustrated in FIGS. 2 and 3 it should be noted that the former modification is more advantageous for metallurgical vessels, wherein the residual level of the melt is lower, whereas the latter modification is more advantageous for metallurgical vessels wherein said residual level of the melt is higher.

In discussing modifications of the light guide given below (FIGS. 4 through 7) we shall confine ourselves to describing the form of its most essential large portion 3.

Figure 4:
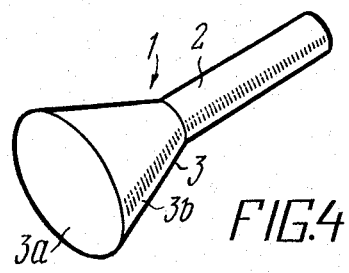
FIG. 4 is a view similar to FIG. 1, but showing a modification, wherein the light guide large portion is constructed in the form of a truncated cone, according to the invention.

FIG. 4 of the appended drawings illustrates a modification wherein the large portion 3 of the light guide is constructed in the form of a truncated cone. In this case the larger base 3a of said cone is an operating end of the light guide 1.

Such a modification of the light guide may be recommended for metallurgical vessels wherein thickness of the isothermic layer of the crucible wall is not less than the length of the large portion 3 of the light guide, which thickness allowing that said light guide be mounted directly at the bottom of a metallurgical vessel. In particular, this light guide is especially suitable both for induction crucible furnaces and converters and can be made from synthetic corundum.

Figure 5:
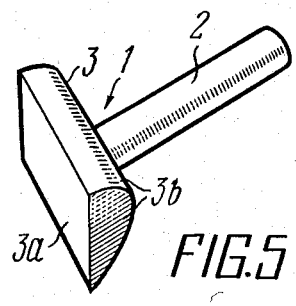
FIG. 5 is a view similar to FIG. 1, but showing a modification, wherein the light guide large portion is constructed in the form of a semicylinder, according to the invention.

In the modifications illustrated in FIGS. 2 through 4 the geometrical axes of both the large portion 3 and the narrow portion 2 coincide. Other modifications are also possible and, in particular, as shown in FIG. 5 of the accompanying drawings. According to this modification the large portion 3 is constructed in the form of a semicylinder whose axis is perpendicular to the axis of the narrow portion 2 of the light guide 1, i.e. it is perpendicular to the optical axis of the latter.

When comparing the modifications illustrated in FIGS. 4 and 5 it should be pointed out that the light guide 1, according to the latter of said modifications, possessing the same degree of blackness of the operating end 3a, has a smaller longitudinal size of the large portion 3 than that in the former modification. This enables the light guide illustrated in FIG. 5 to be employed for the metallurgical vessels having a thinner isothermic layer, which makes it possible that this light guide should be mounted both at the bottom and in the side wall of the metallurgical vessel. Said modification of the light guide 1 may be recommended for such metallurgical vessels as induction furnaces, crucibles and bale-out pot furnaces when the light guide is made from quartz glass.

Figure 6:
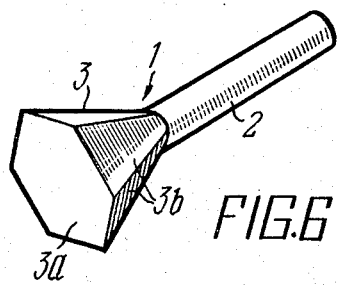
FIG. 6 is a view similar to FIG. 1 but showing a modification wherein the light guide large portion is constructed in the form of a truncated pyramid, according to the invention.

FIG. 6 of the appended drawings illustrates a modification of the proposed light guide wherein the large portion 3 is constructed in the form of a truncated pyramid. Such a modification of the light guide 1 is suitable for the metallurgical vessels wherein thickness of the isothermic layer of the side wall is not less than the length of the large portion 3 when the light guide is made from quartz glass.

In particular, this light guide can well be employed in induction crucible, cupel, bale-out pot furnaces as well as in bath-furnaces and magnetic hydrodynamic pumps.

It should be noted that the modifications of the light guide 1 illustrated in FIGS. 2 and 3 are preferable for the metallurgical vessels having wide fluctuations in the temperature of a melt, for example, for high-frequency induction melting furnaces. The modifications shown in FIGS. 4 through 6 are suitable for the metallurgical vessels having inconsiderable fluctuations in the temperature of a melt such as cupolas, holding furnaces, bale-out pot furnaces, etc.

Figure 7:
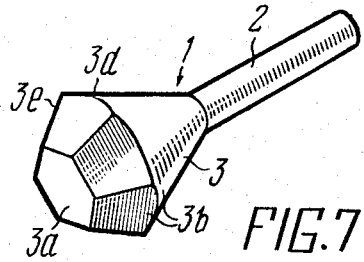
FIG. 7 is a view similar to FIG. 1 but showing a modification wherein the light guide large portion is formed by a truncated cone and a truncated pyramid, according to the invention.

FIG. 7 of the appended drawings illustrates a modification of the proposed light guide wherein the large portion 3 is formed by a truncated cone $3d$ and a truncated pyramid $3e$ with their larger bases joined. When having such a combined form of the light guide 1, it is possible that the area of the operating end $3a$ be considerably reduced as compared to the area of the lateral surface $3b$ of the large portion 3 and said area of the operating end $3a$ can practically be made very small. This, in turn, makes it possible that the influence of variation of the radiation ability of the operating end $3a$ on the measurement error of the temperature of a melt be considerably decreased. Besides, the requirements are reduced as to thermal shock resistance of the materials used for manufacturing the light guide 1 because the smaller is the operating end $3a$ contacting the melt the larger portion of the surface of the light guide 1 can be protected against high temperatures by a proper lining.

With a relatively small area of the operating end $3a$, a probability of deterioration thereof from thermal shocks is reduced that is why the light guide constructed as shown in FIG. 7 can be employed in such metallurgical vessels wherein the temperature of the melt varies in a wide range. In particular, such wide fluctuation in the temperature of the melt occurs in converters, electric-arc furnaces and induction melting furnaces.

To better understand the nature of the present invention, refer to FIGS. 8 and 9 of the accompanying drawings. Said Figures illustrate a bottom portion of a metallurigcal vessel 4 filled with melt 5 and the light guide mounted in a lining 6 of the metallurgical vessel 4 and a pyrometer 7 positioned behind the latter. In this case FIG. 8 illustrates such an embodiment, wherein the large portion 3 of the light guide 1 is completely located in an isothermic layer $6a$ of the lining 6, whereas FIG. 9 illustrates an embodiment wherein the large portion 3 extends outside the boundaries of the isothermic layer $6a$ and, in fact, is placed in a non-isothermic layer $6b$.

In the isothermic layer $6a$ of the lining 6 the temperature is practically equal to all points and coincides with the temperature of the melt 5 in the zone wherein the operating end $3a$ of the light guide 1 is located. That is why, if the large portion 3 of the light guide 1 is completely located in this layer, as shown in FIG. 8, between the operating end $3a$ and its lateral surface $3b$ an equibalance thermal radiation is established. When such radiation is produced, both the operating end $3a$ and the surface $3b$ are the sources of energy of equal intensity, each radiating as much energy per unit time as it absorbs. Such an exchange of thermal energy is diagrammatically illustrated by solid arrows in FIG. 8. Through the narrow portion 2 of the light guide 1 thermal radiation is delivered to the pyrometer 7. It should be noted that in this case it is not obligatory to apply a mirror layer on the surface $3o$ of the light guide 1 that is why the surface finish thereof may be relatively not high.

In the case when the large portion 3 of the light guide is substantially located in the non-isothermic layer $6b$ of the lining 6 (FIG. 9) only the operating end $3a$ of the light guide 1 represents a radiator whereas the lateral surface $3o$ having a layer of the mirror coating $3c$ is a reflector, i.e. it serves for reflecting thermal radiation backwards to the operating end (reflected thermal beams are shown by dotted and radiated beams by solid arrows). Due to this the thermal radiation of the operating end $3a$ of the light guide 1, delivered to the pyrometer 7 in spite of the temperature variations between said end and the surface $3b$, will be equibalanced, i.e. its characteristics will correspond to the characteristics of radiation of an absolutely black body.

FIGS. 8 and 9 illustrate the process of the thermal radiation transfer from the melt 5 to the pyrometer 7 with the aid of the light guide 1 constructed according to a preferable embodiment similar to that shown in FIG. 3. But it is quite apparent that this process will proceed similarly if the light guide is constructed according to any other modification discussed in detail above.

Thus, any of the described modifications of the light guide 1 (FIGS. 1 through 7) ensures producing thermal radiation of the operating end $3a$ substantially in the form of radiation of an absolutely black body, which makes it possible, as has been shown above, to considerably increase the intensity of this radiation and make it practically stable irrespective of roughness of the operating end and the chemical composition of the melt 5 being controlled.

Measuring the temperature of the melt 5 with the aid of the light guide 1 is carried on, according to the proposed method, as follows (FIG. 10 of the appended drawings). The light guide is mounted in a lining 6 of metallurgical vessel, with a large portion 3 of said light guide facing melt 5 and a narrow portion 2 thereof extending through the lining 6 outside to a pyrometer 7. The light guide is mounted so that its geometrical axis passes through a strictly definite point on the inner surface of the lining 6.

Firstly, this point must be located in the zone of maximum circulation of the melt. The location of said zone and its boundaries may be determined with a sufficient accuracy for any metallurgical vessel. In FIG. 10 the zone of maximum circulation of the melt is confined by "l". Zones of slagging of the lining 6 are marked by reference numeral 8.

Secondly, said point must be located relative to the residual level $5a$ of the melt 5 at the depth "h" which should be not less than the sum of the thickness "t" of the lining at this level and a value which is equal to half the maximum transverse size "d" of the large portion 3 of the light guide 1. Evidently, if the large portion 3 is constructed in the form of a body of revolution, said size is the maximum diameter of said portion.

Thus, the depth "h" at which said point is located relative and residual level $5a$ of the melt 5 will be determined by:

$$h > t + d/2$$

After mounting the light guide 1, the pyrometer 7 must be properly sighted on. For the purpose of measuring any of the known types of pyrometers can be used including such relatively simple devices as a partial radiation pyrometer or a colour comparison monochromatic pyrometer whose constructions are known and require no detailed description.

Determining temperature of the melt 5 is performed with the aid of the pyrometer 7 by measuring characteristics of the thermal radiation caused by the melt 5 in the zone adjacent said point on the inner surface of the lining 6, and transmitted to said pyrometer by the light guide 1.

In such a method of measuring temperature, comprising the measuring at a definite (characteristic) point whose coordinates are determined depending on the characteristics of a metallurgical vessel (boundaries of the zone of maximum circulation of the melt, the column of the residual level, thickness of the lining at this level), a high accuracy of measuring the mass-average temperature of the melt is achieved and a reliability of the proposed light guide is increased.

A preferable embodiment of the proposed method and diagrammatic representation thereof are illustrated in FIG. 11 of the accompanying drawings. According to this embodiment the light guide 1 is mounted so that its geometrical axis passes through the point located within the zone "1" of the maximum circulation of the melt 5 at the minimum possible distance from the bottom 4a of the metallurgical vessel 4. In such embodiment of the method the light guide is subjected to a minimum mechanical load on the part of the lining 6 because close to the bottom 4a a relative displacement of the lining 6 layers is insignificant. This considerably increases durability of the light guide and decreases errors in measuring the temperature of the melt 5.

The invention will now be described, with reference to the specific examples of measuring temperatures of certain melts according to the proposed method and with the aid of the proposed light guide embodied in various modifications.

EXAMPLE 1

For measuring the temperature of iron in a metallurgical vessel in the range from 1,300° to 1,500° C. a light guide made from leucosapphire was used constructed as shown in FIG. 3, and having a mirror coating on the whole of its lateral surface. Measurements were carried out according to the proposed method with the aid of a colour comparison monochromatic pyrometer with the operating wave length equal to $0.65\mu$. In this case the parameters of the light guide and the metallurgical vessel were as follows:
  the total length of the light guide—200 mm;
  the maximum transverse size of the light guide large portion (diameter of the hemisphere)—40 mm;
  the ratio of the diameter of the light guide narrow portion to that of its large portion $d_1/d_2$— 0.2;
  the lining thickness of the metallurgical vessel at the level corresponding to the residual level of the melt—150 mm;
  thickness of the isothermic layer of the lining—not exceeding 10 mm.

With this stated thickness of the lining and its isothermic layer the large portion of the light guide was embedded, in fact, in the non-isothermic layer of the lining.

In this case the absolute change in the radiation ability of the light guide operating end caused by the formation of the oxide film on said end did not exceed 0.01 which is 35 times less than in the prior art light guide under the same conditions. The component of the measurement error corresponding to said change of the radiation ability did not exceed 0.1% whereas in the prior art light guide this component reached 3.5%.

EXAMPLE 2

Under the conditions similar to example 1 a light guide was used having the ratio of $d_1/d_2$ equal to 0.5. In this case the component of the measurement error did not exceed 0.44% which is 8 times less than in the prior art light guide.

EXAMPLE 3

Under the conditions similar to example 1 a light guide was used having the ratio of $d_1/d_2$ equal to 0.8. In this case the component of the measurement error did not exceed 1.1% which is more than 3 times less than in the prior art light guide.

EXAMPLE 4

For measuring the temperature of molten quartz glass in the range from 1,800° to 1,900° C. a light guide was used constructed similarly to that illustrated in example 1. Measurements were carried out by the partial radiation pyrometer with the operating spectral range from 0.8 to $1.8\mu$.

In this case the absolute change in the radiation ability of the light guide operating and, caused by the roughness alteration of said end in the process of operation, did not exceed 0.004 which is 45 times less than <—> light guide <in the prior art> under similar conditions. In this case the component of the measurement error corresponding to said variation of the radiation ability did not exceed 0.4% whereas <in the prior art> light guide this component reached 18%.

EXAMPLE 5

Under the conditions similar to example 4 a light guide was used having the ratio of $d_1/d_2$ equal to 0.3. In this case the component of the measurement error did not exceed 0.8% which is more than 20 times less than in the prior art light guide.

EXAMPLE 6

Under the conditions similar to example 4 a light guide was used having the ratio of $d_1/d_2$ equal to 0.4. In this case the component of the measurement error did not exceed 1% which is 16 times less than in the light guide prior art.

EXAMPLE 7

With the aid of the same light guide and in the same metallurgical vessel, shown in example 1, temperature of molten silver was measured in the range from 1.100° to 1.200° C.

In this case the absolute variation of the radiation ability of the light guide operating end caused by the formation of the oxide film on said end did not exceed 0.02 which is 45 times less than in the prior art light guide under similar conditions. In this case the component of the measurement error corresponding to said variation of the radiation ability did not exceed 0.2% whereas in prior art the light guide this component reached 9%.

EXAMPLE 8

Under the conditions similar to example 7 a light guide was used with the ratio of $d_1/d_2$ equal to 0.3. In this case the component of the error measurement did not exceed 0.4% which is more than 22 times less than in the prior art light guide.

EXAMPLE 9

With the aid of the same light guide and in the same metallurgical vessel, shown in example 1, the temperature of molten copper was measured in the range from 1,200° to 1,300° C.

In this case the absolute variation of the radiation ability of the light guide operating end caused by the formation of the oxide film on said end did not exceed 0.01 which is 50 times less than in the prior art light guide under similar conditions. In this case the component of the measurement error corresponding to said variation of the radiation ability did not exceed 0.1% whereas in the prior art light guide this component reached 5%.

EXAMPLE 10

Under the conditions similar to example 9 a light guide was used with the ratio of $d_1/d_2$ equal to 0.3. In this case the component of the measurement error did not exceed 0.3% which is 17 times less than in the prior art light guide.

EXAMPLE 11

Under the conditions similar to example 1 a light guide was used constructed as shown in FIG. 2, with the ratio of the area of the narrow portion cross-section of said light guide to the area of the lateral surface of its large portion $s_1/s_2$ equal to 0.2. In this case the component of the measurement error did not exceed 1.1% which is 3.5 times less than in the light guide prior known in the art.

EXAMPLE 12

Under the conditions similar to example 4 a light guide was used, as shown in FIG. 2, with the ratio of $s_1/s_2$ equal to 0.06. In this case the component of the measurement error did not exceed 1% wich is 18 times less than in the light guide prior known in the art.

EXAMPLE 13

Under the conditions similar to example 1 a light guide was used constructed, as shown in FIG. 7, with the ratio of $s_1/s_2$ equal to 0.5. The light guide was mounted so that its large portion was completely embedded in the isothermic layer of the linging. In this case the component of the measurement error did not exceed 1.7% which is 20 times less than in the light guide prior known in the art.

EXAMPLE 14

Under the conditions similar to example 4 a light guide was used constructed, as shown in FIG. 7, with the ratio of $s_1/s_2$ equal to 0.05. The large portion of the light guide was completely embedded in the isothermic layer of the lining. In this case the component of the measurement error did not exceed 0.8% which is 20 times less than in the light guide prior known in the art.

EXAMPLE 15

Under the conditions similar to example 1 a light guide was used constructed, as shown in FIG. 4, with the ratio of $s_1/s_2$ equal to 0.25. The large portion of the light guide was completely embedded in the isothermic layer of the lining. In this case the component of the measurement error did not exceed 1.3% which is more than 2 times less than in the prior art light guide.

EXAMPLE 16

Under the conditions similar to example 4 a light guide was used constructed, as shown in FIG. 4, with the ratio of $s_1/s_2$ equal to 0.08. The large portion of the light guide was completely embedded in the isothermic layer of the lining. In this case the component of the measurement error was about 1% which is 18 times less than in the prior art light guide.

EXAMPLE 17

For measuring the temperature of molten aluminium in the range from 650° to 800° C. a light guide made from quartz glass was used constructed, as shown in FIG. 5, having the ratio of $s_1/s_2$ equal to 0.1 as well as the partial radiation pyrometer identical to that in example 4. The total length of the light guide and the lining thickness were identical to those stated in example 1.

In this case the absolute variation of the radiation ability of the light guide operating end stipulated by alteration of its roughness in the process of operation thereof did not exceed 0.01 which is 10 times less than in the light guide prior known in the art under similar conditions. In this case the component of the measurement error corresponding to said variation of the radiation ability did not exceed 1% whereas in the prior art light guide this component reached 10%.

EXAMPLE 18

Under the conditions similar to example 17 a light guide was used constructed, as shown in FIG. 6, whose ratio $s/s_2$ was equal to 0.04.

In this case the component of the measurement error did not exceed 0.5% which is 20 times less than in the prior art light guide.

EXAMPLE 19

In order to determine the influence of the light guide mounting site on the reliability of its operation, 3 groups of light guides, 15 pieces in each, were mounted in the induction furnace for melting pig iron. All said light guides were made from leucosapphire.

The light guides of the first and second groups were used for measuring the temperature of the molten metal according to the proposed method and constructed, as shown in FIG. 4. In this case each light guide of the first group was mounted as shown in FIG. 10 and each light guide of the second group was mounted as shown in FIG. 11.

The third group included known in the art light guides, in particular, having the form of a cylindrical rod with the aid of which measurements were taken according to the known in the art method, i.e. the disposition of these light guides did not correspond to that shown in FIGS. 10 and 11. In particular, the first 5 light guides were positioned higher than the residual level of the melt, the next 5 light guides were positioned outside the zone of the maximum circulation of the melt and each of the remainder light guides was positioned relative to the residual level so that its geometrical axis was at a depth smaller than the lining thickness at this level.

For 1,500 hours of the furnace operation (the lining thermal life) only one light guide (FIG. 10) was deteriorated in the first group while in the second group (FIG. 11) no deteriorated light guides were observed at all. In this case the measurement error for the light guides of the first and second groups was within the limits of a permissible value.

At the same time all the light guides of the third group were destroyed and the measurement error when employing these light guides greatly exceeded a permissible value. Such a great mesurement error was stipulated, in particular, for the first 5 light guides by the deterioration of the operating ends and the middle portions of said light guides, for the next 5 light guides by the deterioration of their middle portions and for the remainder 5 light guides by the deterioration of their middle portions and slagging of the operating ends thereof.

EXAMPLE 20 (negative)

Under the conditions similar to example 1 a light guide was used, as shown in FIG. 4, whose ratio $s_1/s_2$ was equal to 0.75, i.e. exceeded a specified value. The light guide large portion was completely embedded in the isothermic layer of the lining.

In this case the component of the measurement error reached about 4%, which considerably exceeds a permissible value of the total measurement error.

EXAMPLE 21 (negative)

Under the conditions similar to example 4 a light guide was used, as shown in FIG. 3, wherein the ratio of $d_1/d_2$ was equal to 0.9, i.e. exceeded a specified value. The light guide large portion was embedded, in fact, in the non-isothermic layer of the lining.

In this case the component of the measurement error was equal to 8% which considerably exceeds a permissible value of the total measurement error.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

Most efficiently the present invention can be used in metal smelting and casting for measuring temperature of ferrous and non-ferrous metals in such metallurgical vessels as induction furnaces, open-hearth furnaces, converters, magnetic hydrodynamic pumps, etc. Moreover, it can also be used in glass and chemical industries for measuring temperature of molten glass, solt, and other materials.

We claim:

1. A light guide for transmitting thermal radiation from a melt to a pyrometer, being substantially a rod made from a refractory light-permeable corrosion-resistant material having a narrow portion intended for transmitting radiation to the pyrometer and a large portion with a flat end forming the operating end of the light guide, the lateral surface of said large portion providing reflection of radiation of the operating end of said large portion from the convex lateral surface of this portion back to said flat operating end; the ratio of the cross-sectional area of said light guide narrow portion at the place of adjoining said large portion to the lateral surface area of this large portion not exceeding 0.5.

2. A light guide as set forth in claim 1, in which the lateral surface of the large portion of the light guide is coated with a mirror layer.

3. A light guide as set forth in claim 1, in which the large portion thereof is constructed in the form of a hemisphere, and the narrow portion is in the form of a cylindrical rod having a diameter not exceeding 0.8 the diameter of the hemisphere.

4. A light guide as set forth in claim 1, wherein said lateral surface of said large portion having the form of a surface of a body of revolution with a convex generating line.

5. A method of measuring the temperature of a melt in a metallurgical vessel with the use of the light guide having a narrow portion intended for transmitting thermal radiation from the melt to the pyrometer and a large portion with a flat end forming the operating end of the light guide, comprising the steps of mounting the light guide so that its large portion is exposed to the melt and the narrow portion is adjoined through the lining outside to the pyrometer so that the geometrical axis of the light guide passes through the point of the inner surface of the lining, located in the zone of the maximum circulation of the melt and lying with respect to the residual level of the melt at a depth h not less than the sum of the thickness t of the lining at said level and a value equal to half the maximum transverse size d of the large portion of the light guide, with the temperature of the melt being determined by measuring characteristics of the thermal radiation of the operating end which is in contact with the melt at said point.

6. A method as set forth in claim 5, in which the light guide is mounted so that said point on the inner surface of the lining is positioned within the zone of the maximum circulation of the melt at the minimum possible distance from the bottom of the metallurgical vessel.

7. A method for measuring the temperature of the melt in a metallurgical apparatus with the use of the light guide having a narrow portion intended for transmitting thermal radiation from the melt to the pyrometer and a large portion with a flat end forming the operating end of the lightguide, comprising arranging the lightguide in the lining of the apparatus and measuring the temperature of the melt with the help of a pyrometer using thermal radiaion transmitted through the lining by said narrow portion of the lightguide, characterized in that the lightguide is arranged so that its wide portion is in contact with the melt, and the narrow portion of the lightguide is extended through the lining outside to the pyrometer in the area of the lining which is located relative to the residual level of the melt at a depth equal to at least the thickness of the lining in contact with the lightguide, the lightguide being arranged at a minimum possible distance from the bottom of the apparatus within the melt circulation zone.

* * * * *